United States Patent [19]
Plichta et al.

[11] Patent Number: 5,011,750
[45] Date of Patent: Apr. 30, 1991

[54] HIGH TEMPERATURE RECHARGEABLE MOLTEN SALT CELL

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 549,176

[22] Filed: Jul. 5, 1990

[51] Int. Cl.⁵ .................................... H01M 10/39
[52] U.S. Cl. .................................... 429/112; 429/218
[58] Field of Search ............... 429/103, 112, 218, 199, 429/221, 223; 423/518, 511

[56] References Cited
U.S. PATENT DOCUMENTS

| | | |
|---|---|---|
| 3,941,612 | 3/1976 | Steunenberg et al. ............ 429/103 |
| 4,006,034 | 2/1977 | Shimotake et al. ............ 429/220 X |
| 4,086,396 | 4/1978 | Mathers et al. ............ 429/103 |
| 4,156,758 | 5/1979 | Vissers et al. ............ 429/112 |
| 4,164,069 | 8/1979 | Tomezuk ............ 429/103 X |

Primary Examiner—Anthony Skapars
Attorney, Agent, or Firm—Michael Zelenka; Roy E. Gordon

[57] ABSTRACT

A high temperature rechargeable molten salt cell is provided using a lithium-aluminum (48 atomic percent Li) alloy as the anode, a eutectic mixture of lithium chloride (59 mole percent) and potassium chloride (41 mole percent) with a melting point of 352° C. as the electrolyte and barium nickel sulfide ($BaNiS_2$) as the cathode active material.

6 Claims, 1 Drawing Sheet

HIGH TEMPERATURE RECHARGEABLE MOLTEN SALT CELL

GOVERNMENT INTEREST

The invention described herein may be manufactured, used, and licensed by or for the Government for governmental purposes without the payment to us of any royalty thereon.

FIELD OF THE INVENTION

This invention relates in general to a high temperature rechargeable molten salt cell and in particular to such a cell using a ternary metal sulfide as the cathode active material.

BACKGROUND OF THE INVENTION

High temperature rechargeable molten salt cells are required for electric propulsion, load leveling and pulse power applications. Amongst the many molten salt battery systems that have been studied over the past many years, the lithium alloy/metal sulfide cell has shown considerable promise for these applications. Heretofore these cells have used a lithium alloy (LiAl), as the anode, an electrolyte of lithium halide-alkali halide mixture (LiCl-KCl eutectic) and a cathode having as the cathode active material a binary metal sulfide of the general formula YS or $YS_2$ where Y=Fe, Co, or Ni. Recently, a new series of ternary metal sulfides having the general formula $XYS_2$ where X=Ba or Ca and Y=Fe, Co or Ni have been synthesised. The ternary metal sulfides are thermally stable to temperatures of about 800° C.

SUMMARY OF THE INVENTION

The general object of this invention is to provide a high temperature molten salt cell where the active cathode material is thermally stable at high temperatures and also provides high specific energy densities and specific power densities for use in pulse power, electric propulsion and load levelling applications.

It has now been found that the aforementioned objectives can be attained by providing a molten salt electrochemical cell where the active cathodic materials are ternary metal sulfides as for example $BaNiS_2$, $BaFeS_2$, and $BaCoS_2$ and substituted compounds pounds having the compositions $XYS_2$ where X can be Be, Mg, Ca, Sr, Ba, or Ra and Y can be Fe, Co, or Ni. Use of these materials as cathodes in an electrochemical cell — containing a Li-Al alloy anode and a molten LiCl-KCl eutectic electrolyte — has been demonstrated to deliver specific energy densities of about 250 Wh/kg at a current density of 10 mA/cm$^2$ for full discharge to 1.0 V and specific power densities of about 30 KW/kg at a current density of 1 A/cm$^2$ based on the weight of $BaNiS_2$.

DESCRIPTION OF THE PREFERRED EMBODIMENT

The electrochemical cell described herein uses a lithium-aluminum (48 atomic percent Li) alloy as the anode, a eutectic mixture of lithium chloride (59 mole percent) and potassium chloride (41 mole percent) with a melting point of 352° C. as the electrolyte, and barium nickel sulfide ($BaNiS_2$) as the cathode active material. The electrochemical cell included a three pellet stack of anode, separator, and cathode. An anode pellet included 0.5 gram (LiAl) pressed in a ½ inch diameter die to 4000 pounds, and a cathode pellet including 0.3 gram (85 weight percent $BaNiS_2$ and 15 weight percent LiCl-KCl) pressed in a ½ inch diameter die to 4000 pounds. The pellets are stacked in a ½ inch diameter boron nitride bushing to guard against edge shorting. The stacked pellet cell is held in compression through the use of a high temperature stainless steel spring assembly with a molybdenum disk at the anode side and a graphite disk at the cathode side to act as current collectors. The spring loaded cell assembly is placed in a pyrex vessel that enables the cell to be operated over an (anhydrous) flowing argon atmosphere. Feedthrough connections through the top of the pyrex vessel provide electrical connection to the positive and negative terminals of the cell.

DESCRIPTION OF THE DRAWING

In FIG. 1, the ordinate is cell voltage, V, and the abscissa is capacity, mAh.

In FIG. 2, the ordinate is energy density, Wh/kg and the abscissa is discharge cycle number. Referring to FIG. 1, based on the following electrochemical cell reaction:

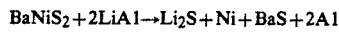

$$BaNiS_2 + 2LiAl \rightarrow Li_2S + Ni + BaS + 2Al$$

the observed cathode utilization at a discharge rate of 10 mA/cm$^2$ is found to be 94 percent (1.88 F/mol) at an average cell potential of 1.38 V. This corresponds to an energy density based solely on $BaNiS_2$ of 256 wh/kg. This electrochemical performance is comparable to that observed with the binary transition metal sulfides, that is, $FeS_2$, $NiS_2$ or $CoS_2$.

Figure 1:
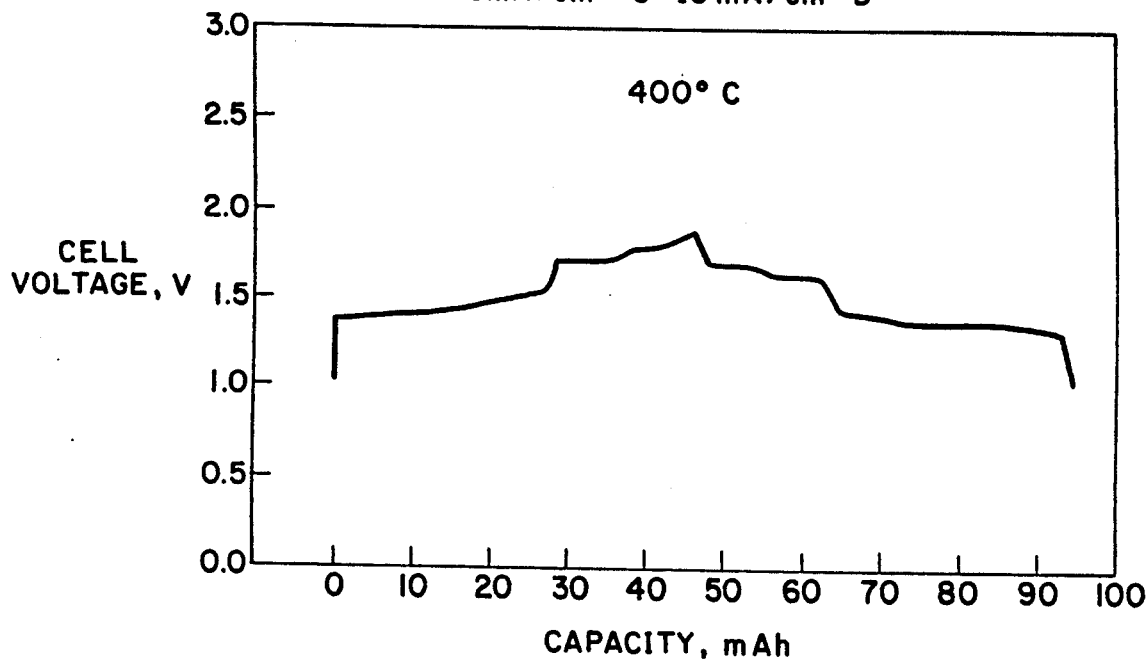
FIG. 1 shows a typical cycle for the LiAl/$BaNiS_2$ cell where the cell demonstrates excellent cycling performance when operated at 400° C. for a charging rate of 5mA/cm$^2$ and a discharge rate of 10 mA/cm$^2$.
Figure 2:
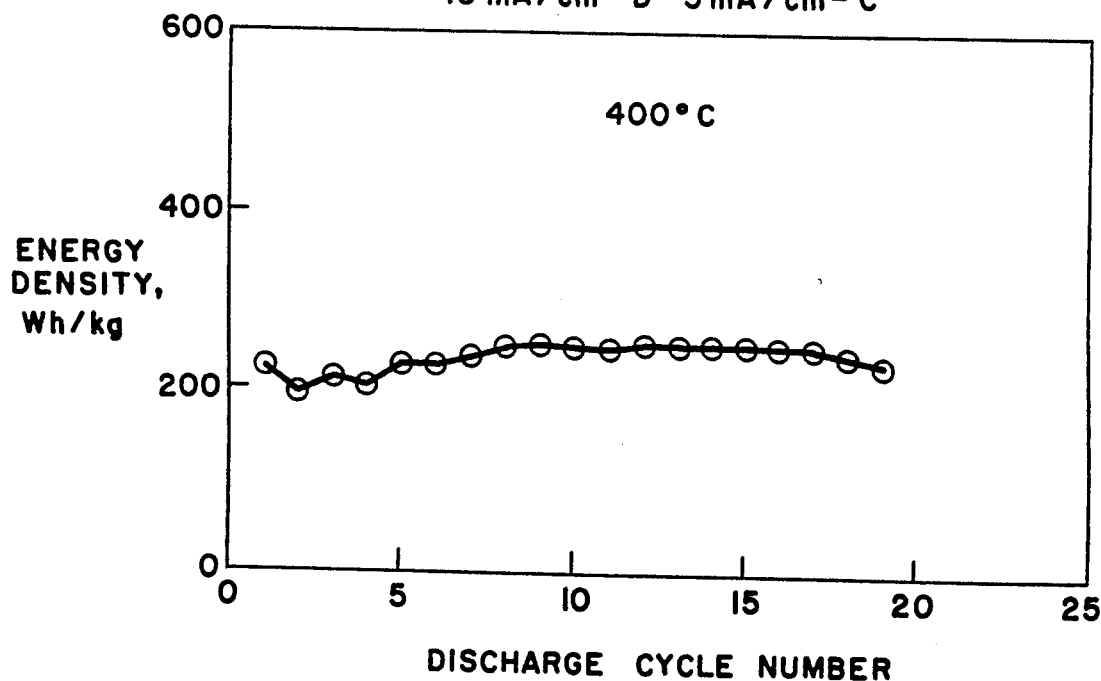
FIG. 2 shows the energy density based on $BaNiS_2$ as a function of discharge cycle number for a cell cycled between 1.75 V and 1.0 V for the first 4 cycles then between 1.85 V and 1.0 V for cycles 5 through 19.

Referring to FIG. 2, no significant loss of cell capacity or performance is observed over these cycling conditions. In addition, the ternary metal sulfides are found to possess excellent thermal stability to temperatures above 800° C. Thermal weight loss measurements performed using a Perkin-Elmer model TGS-Z thermogravimetric analyzer under an argon atmosphere show that $BaNiS_2$ is thermally stable to nearly 850° C.

Other ternary metal sulfides having the general formula $XYS_2$ where X=Be, Mg, Ca, Sr, Ba, or Ra and Y=Fe, Co, or Ni may be substituted for $BaNiS_2$ as the active cathode material in the above mentioned electrochemical molten salt cell.

As the anode of the high temperature molten salt electrochemical cell, one might use Li, LiAl, Na, K, Ca, Mg or any alkali metal or group II A element, or alloy or composite mixture of such thereof.

The separator material of the high temperature rechargeable molten salt cell may be MgO, $Y_2O_3$, $ZrO_2$, including other such electrically insulative materials, or -alumina, or other such ionically conductive separator materials. The separation between the anode and cathode may be provided by a 65 weight percent molten salt electrolyte including any alkali or alkaline earth chloride, fluoride, bromide, iodide or mixture thereof with 35 weight percent of a separator material as aforementioned.

We wish it to be understood that we do not desire to be limited to the exact details of construction shown and described for obvious modifications will occur to a person skilled in the art.

What is claimed is:

1. A high temperature rechargeable molten salt cell comprising a member of the group consisting of lithium, lithium aluminum alloy, lithium silicon alloy, sodium, potassium, calcium, magnesium, an alkali metal, a group II A element, a group II A alloy and composite mixtures thereof, as the anode, a chemical compound of the composition $XYS_2$ wherein X is an element selected from the group consisting of Be, Mg, Ca, Sr, Ba and Ra and Y is an element selected from the group consisting of Fe, Co, and Ni as the cathode active material and a member of the group consisting of a molten salt, and a eutectic mixture of metal halides, carbonates, nitrates and oxalates as the electrolyte.

2. A high temperature rechargeable molten salt cell according to claim 1 wherein a lithium-aluminum (48 atomic percent lithium) alloy is the anode, a eutectic mixture of lithium chloride (59 mole percent) and potassium chloride (41 mole percent) with a melting point of 352° C. is the electrolyte, and a compound selected from the group consisting of $BaNiS_2$, $BaFeS_2$ and $BaCoS_2$ is the cathode active material.

3. A high temperature rechargeable molten salt cell according to claim 2 wherein the cathode active material is $BaNiS_2$.

4. A high temperature rechargeable molten salt cell according to claim 2 wherein the cathode active material is $BaFeS_2$.

5. A high temperature rechargeable molten salt cell according to claim 2 wherein the cathode active material is $BaCoS_2$.

6. A high temperature rechargeable molten salt cell including a cathode of about 80 to 90 weight percent of $BaNiS_2$ and about 20 to 10 weight percent of LiCl-KCl eutectic electrolyte, a separator of about 65 weight percent LiCl-KCl eutectic electrolyte and 35 weight percent MgO, and an anode of LiAl alloy of about 48 mole percent Li.

* * * * *